US012675402B2

(12) United States Patent
Muthiah

(10) Patent No.: US 12,675,402 B2
(45) Date of Patent: Jul. 7, 2026

(54) DATA STORAGE DEVICE AND METHOD FOR VIDEO PROCESSING AND VIDEO FRAME SEARCHING USING A KEY-VALUE

(71) Applicant: Sandisk Technologies, Inc., Milpitas, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 44 days.

(21) Appl. No.: 18/734,516

(22) Filed: Jun. 5, 2024

(65) Prior Publication Data

US 2025/0378025 A1      Dec. 11, 2025

(51) Int. Cl.
*G06F 12/06*          (2006.01)
*G06F 16/783*         (2019.01)

(52) U.S. Cl.
CPC ............ *G06F 12/06* (2013.01); *G06F 16/783* (2019.01); *G06F 2212/7201* (2013.01)

(58) Field of Classification Search
CPC ......... G06F 12/0246; G06F 2212/7201; G06F 16/71; G06F 16/739; G06F 16/7837; G06F 16/78; G06F 12/06; G06F 16/783; G06F 16/70; G06F 12/02
USPC ...... 711/103, 12.008, 100, 12.002, 154, 203, 711/202, 209
See application file for complete search history.

(56) References Cited

U.S. PATENT DOCUMENTS

| | | | |
|---|---|---|---|
| 7,903,743 B2 | 3/2011 | Ho | |
| 9,971,526 B1 * | 5/2018 | Wei ......................... | G06F 3/064 |
| 10,396,991 B2 | 8/2019 | Arasu et al. | |

| | | | |
|---|---|---|---|
| 10,649,969 B2 | 5/2020 | De | |
| 10,831,734 B2 | 11/2020 | Li et al. | |
| 11,093,143 B2 * | 8/2021 | Tumkur Shivanand ..................... | |
| | | | G06F 3/0688 |
| 11,392,544 B2 | 7/2022 | Bisson et al. | |
| 11,416,542 B1 * | 8/2022 | Campbell .............. | H04N 7/188 |

(Continued)

OTHER PUBLICATIONS

Martin, Bill; "N VMe® Key Value Command Set Provides the Key to Storage Efficiency"; NVM Express blog; downloaded from the Internet at *NVMe® Key Value Command Set Provides the Key to Storage Efficiency—NVM Express* on Jun. 5, 2024; NVM Express; 2024; 4 pages.

(Continued)

*Primary Examiner* — Jared I Rutz
*Assistant Examiner* — Edward Waddy, Jr.
(74) *Attorney, Agent, or Firm* — Crowell & Moring LLP

(57) ABSTRACT

A data storage device and method are provided for video processing and video frame searching using a key-value. In one embodiment, a data storage device is provided comprising a memory and one or more processors. The one or more processors, individually or in combination, are configured to: extract metadata of at least one video frame of a plurality of video frames stored as a single value in a location in the memory that is addressed by a key instead of by a logical block address; perform a post-processing operation on one or more video frames of the plurality of video frames according to the extracted metadata; and store the plurality of video frames and a result of the post-processing operation in a location in the memory that is addressed by a logical block address instead of by a key. Other embodiments are provided.

18 Claims, 7 Drawing Sheets

(56)     References Cited

U.S. PATENT DOCUMENTS

| | | | | |
|---|---|---|---|---|
| 2006/0233534 | A1* | 10/2006 | Haupt | H04N 9/8063 |
| | | | | 386/E9.017 |
| 2008/0306998 | A1* | 12/2008 | Martinez | G06F 16/48 |
| 2011/0295851 | A1* | 12/2011 | El-Saban | G06F 16/748 |
| | | | | 715/764 |
| 2014/0244898 | A1* | 8/2014 | Liu | G06F 12/126 |
| | | | | 711/103 |
| 2014/0325115 | A1* | 10/2014 | Ramsundar | G06F 3/0688 |
| | | | | 711/163 |
| 2016/0274797 | A1* | 9/2016 | Hahn | G06F 3/0626 |
| 2019/0146682 | A1* | 5/2019 | Subramanian | G06F 3/0659 |
| | | | | 711/103 |
| 2021/0314651 | A1* | 10/2021 | Gore | H04N 21/4348 |
| 2023/0205453 | A1* | 6/2023 | Hulton | G06F 3/0679 |
| | | | | 711/154 |

OTHER PUBLICATIONS

"The Key to Value: Understanding the NVMe Key-Value Standard"; live webcast agenda and summary; downloaded from the Internet at *Key-Value-Storage-Standard-Final.pdf* (snia.org) on Jun. 5, 2024; Storage Networking Industry Association; Sep. 1, 2020; 31 pages.

\* cited by examiner

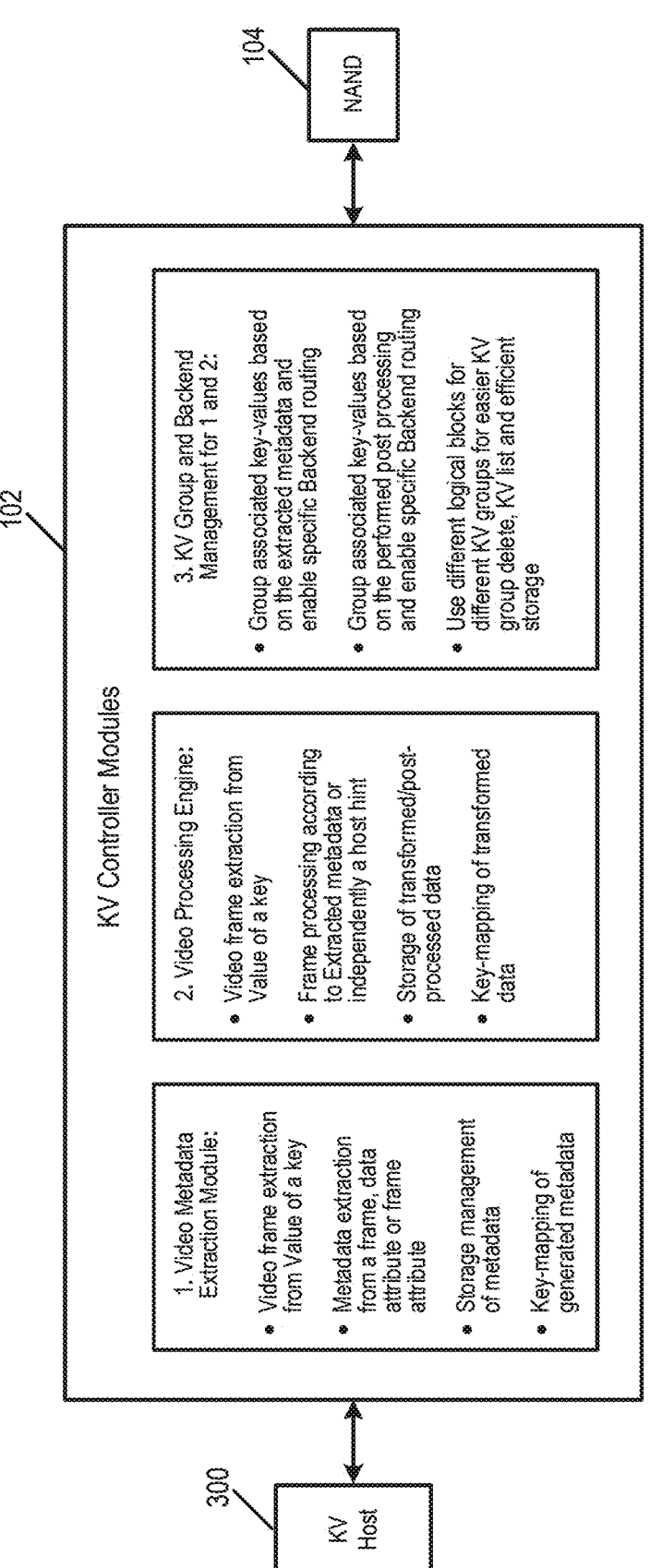

NAND    104

102

KV Host    300

KV Controller Modules

1. Video Metadata Extraction Module:

- Video frame extraction from Value of a key
- Metadata extraction from a frame, data attribute or frame attribute
- Storage management of metadata
- Key-mapping of generated metadata

2. Video Processing Engine:

- Video frame extraction from Value of a key
- Frame processing according to Extracted metadata or independently a host hint
- Storage of transformed/post-processed data
- Key-mapping of transformed data

3. KV Group and Backend Management for 1 and 2:

- Group associated key-values based on the extracted metadata and enable specific Backend routing
- Group associated key-values based on the performed post processing and enable specific Backend routing
- Use different logical blocks for different KV groups for easier KV group delete, KV list and efficient storage

FIG. 4

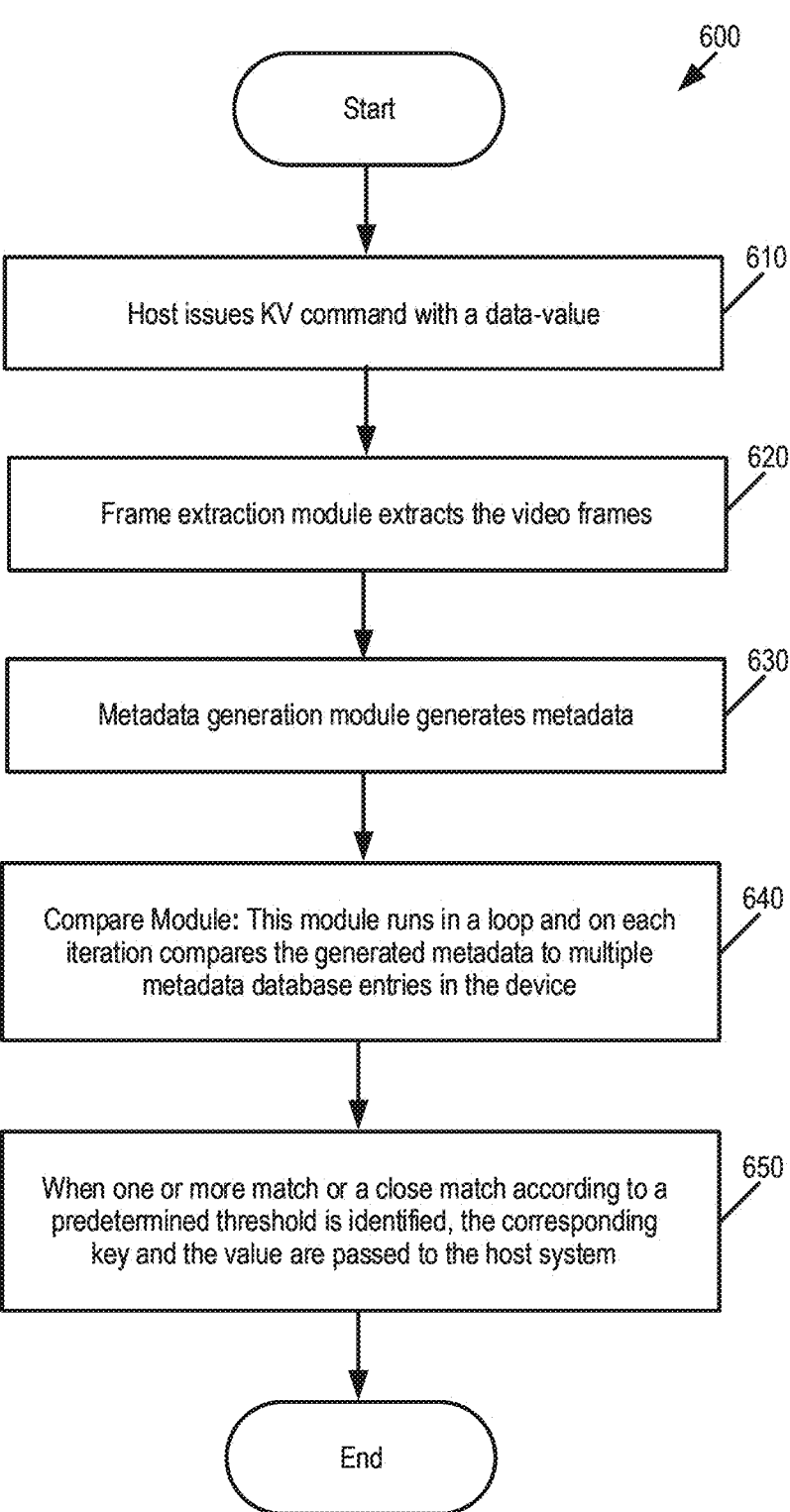

600

Start

Host issues KV command with a data-value          610

Frame extraction module extracts the video frames          620

Metadata generation module generates metadata          630

Compare Module: This module runs in a loop and on each iteration compares the generated metadata to multiple metadata database entries in the device          640

When one or more match or a close match according to a predetermined threshold is identified, the corresponding key and the value are passed to the host system          650

End

FIG. 6

DATA STORAGE DEVICE AND METHOD FOR VIDEO PROCESSING AND VIDEO FRAME SEARCHING USING A KEY-VALUE

BACKGROUND

The Non-Volatile Memory Express (NVMe) Key Value (NVMe-KV) Command Set provides access to data on an NVMe namespace using a key rather than a logical block address. In a key-value command set, data is the "value," and the key points to the memory location that stores the data. The nature and size of the value depend on the specific use case and implementation. The key is passed directly by a host to a data storage device, so the data storage device handles the physical mapping. In this way, the host can avoid tracking logical block addresses, and the data storage device does not need to perform logical-to-physical mapping, which can improve performance.

BRIEF DESCRIPTION OF THE DRAWINGS

FIG. 4 is a block diagram of a controller of an embodiment.

FIG. 6 is a flow chart of a method of an embodiment for performing a key- value compare command.

DETAILED DESCRIPTION

Figures 1A, 1B, 1C:
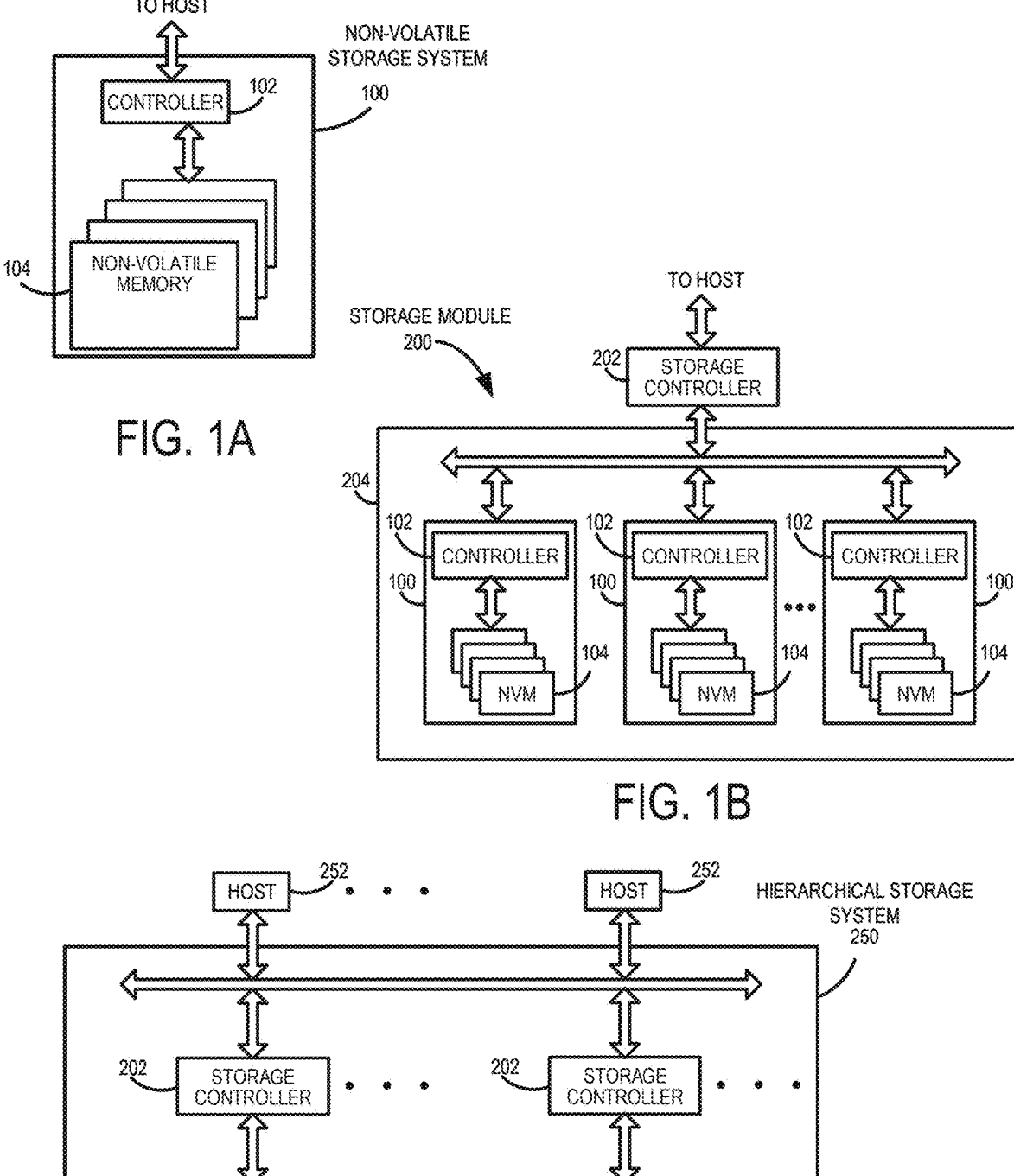
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for video processing and video frame searching using a key-value. In one embodiment, a data storage device is provided comprising a memory and one or more processors. The one or more processors, individually or in combination, are configured to: extract metadata of at least one video frame of a plurality of video frames stored as a single value in a location in the memory that is addressed by a key instead of by a logical block address; perform a post-processing operation on one or more video frames of the plurality of video frames according to the extracted metadata; and store the plurality of video frames and a result of the post-processing operation in a location in the memory that is addressed by a logical block address instead of by a key.

In some embodiments, the one or more processors, individually or in combination, are further configured to: store, in the location in the memory that is addressed by the logical block address, a plurality of video frames and a result of a post-processing operation from at least one other key-value pair that comprises matching metadata.

In some embodiments, the one or more processors, individually or in combination, are further configured to: store, in another location in the memory that is addressed by another logical block address, a plurality of video frames and a result of a post-processing operation from at least one other key-value pair that comprises non-matching metadata.

In some embodiments, the one or more processors, individually or in combination, are further configured to: perform data management leveraging key-value group information based on metadata and/or based on processed data.

In some embodiments, the extracted metadata comprises at least one object identified in the at least one video frame through object analysis.

In some embodiments, the extracted metadata comprises a property of the at least one video frame.

In some embodiments, the property comprises compression type, resolution, identification of an interlaced/progressive frame, aspect ratio, and/or global position satellite (GPS) information.

In some embodiments, the extracted metadata comprises a vendor-specific host hint.

In some embodiments, the memory comprises a three-dimensional memory.

In another embodiment, a method is provided that is performed in a data storage device comprising a memory. The method comprises: receiving a plurality of video frames to be stored as a single value in a first location in the memory that is addressed by a key instead of by a logical block address; generating text metadata for at least one video frame of the plurality of video frames; storing the text metadata in a second location in the memory mapped to the key; and using the text metadata to identify the at least one video frame of the plurality of video frames during a video frame search.

In some embodiments, the text metadata is generated from an object analysis performed on the at least one video frame of the plurality of video frames.

In some embodiments, the text metadata is generated by parsing inherent frame metadata.

In some embodiments, the text metadata is generated based on a host hint.

In some embodiments, the method is performed during a key-value store operation.

In some embodiments, the method is performed during idle time.

In some embodiments, the text metadata is stored in a data structure storing other text metadata for other video frames.

In some embodiments, the method further comprises: receiving a data value for a video frame search; generating text metadata of the data value; and performing a text-based comparison of the generated text metadata and the stored text metadata.

In some embodiments, the method further comprises performing a key-value compare operation.

In some embodiments, the second location in the memory comprises a single-level cell block.

In yet another embodiment, a data storage device is provided comprising: a memory; means for extracting metadata from at least one video frame in a key-value pair that comprises a plurality of video frames; means for performing a post-processing operation on one or more video frames of the plurality of video frames; and means for grouping and storing related key-value pairs in a location in the memory that is addressed by a logical block address instead of by a key.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
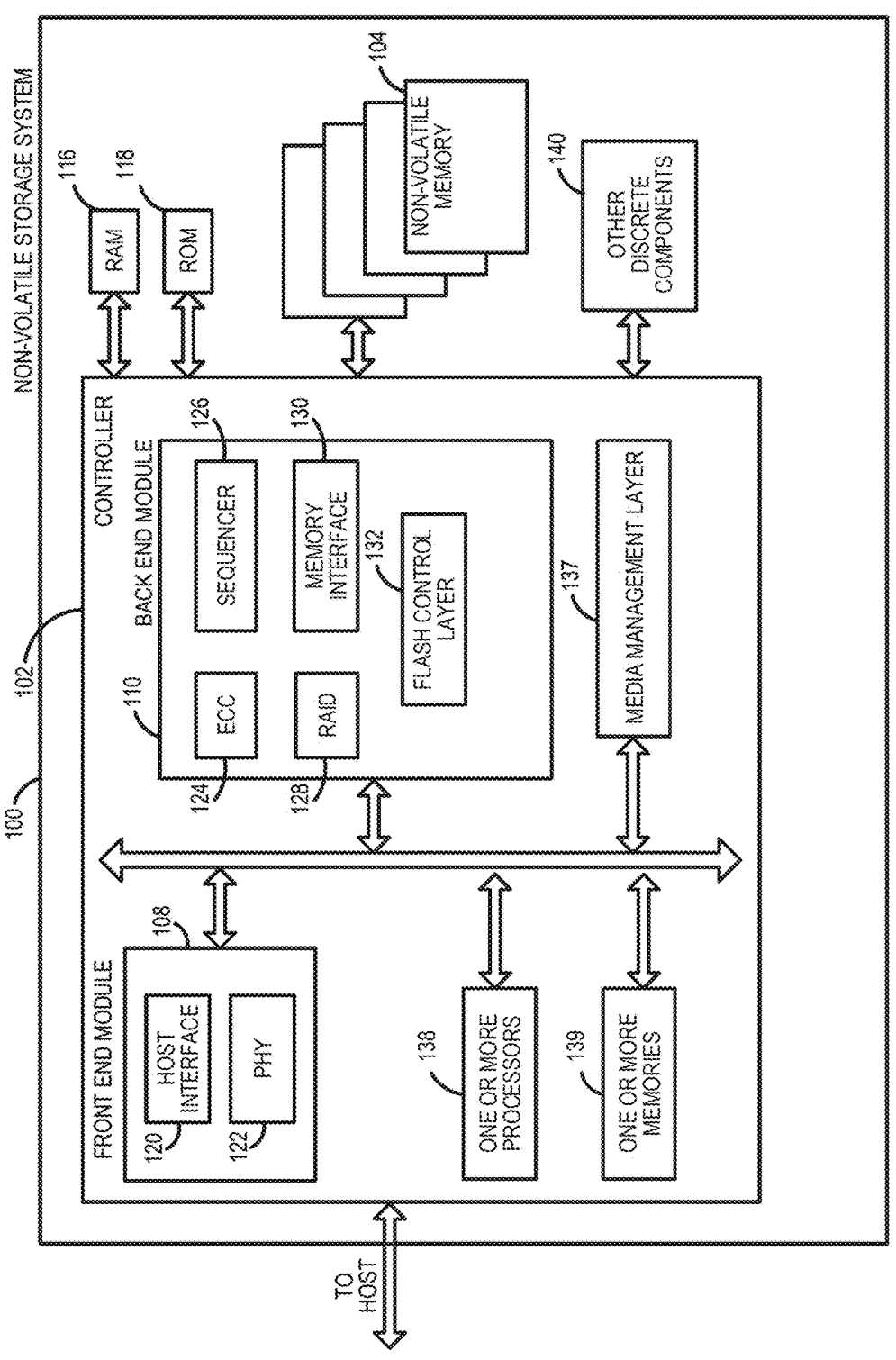
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
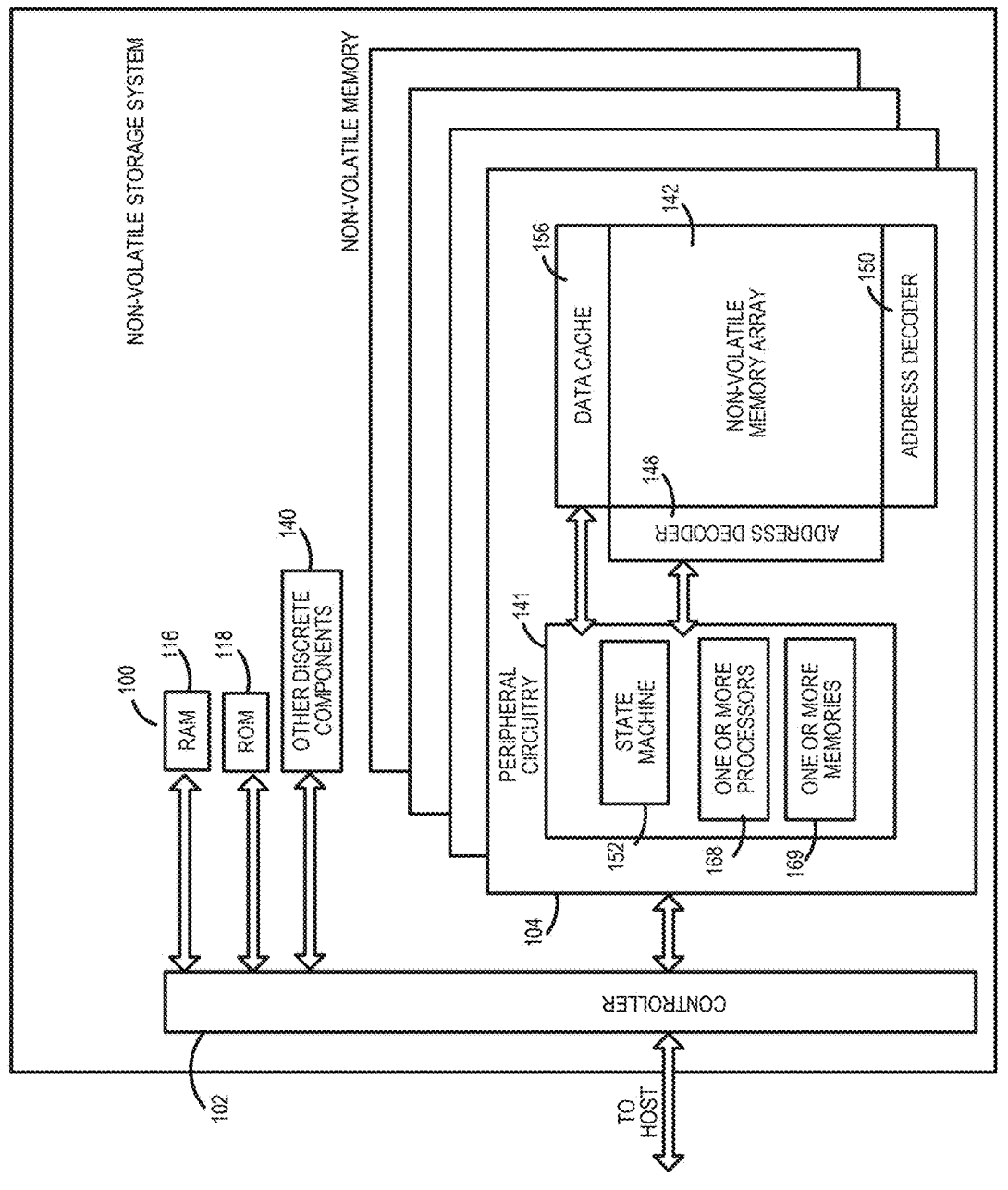
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
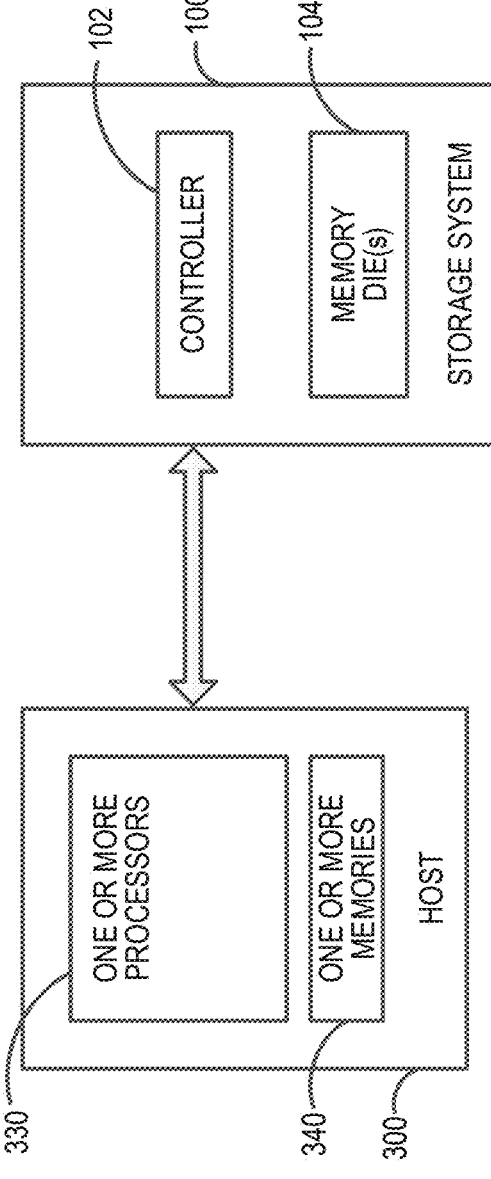
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform, individually or in combination, the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, the host 300 can provide the data storage device 100 with a logical block address (LBA) (e.g., in a read or write command), and the controller 102 of the data storage device 100 can use a logical-to-physical address translation map to identify a physical address in the memory 104 that corresponds to the logical block address. Additionally or alternatively, a key-value command set can be used, such as the NVMe Key Value (NVMe-KV) Command Set, which provides access to data on an NVMe namespace using a key rather than a logical block address. In a key-value command set, data is the "value," and the key points to the memory location that stores the data. The nature and size of the value depend on the specific use case and implementation. The key is passed directly by the host 300 to the data storage device 100, so the data storage device 100 handles the physical mapping. In this way, the host 300 can avoid tracking logical block addresses, and the data storage device 100 does not need to perform logical-to-physical mapping, which can improve performance.

As mentioned above, there are several differences between block storage and key-value storage. For example, with block storage, data is stored in blocks of a fixed size, data is addressed by an LBA, which is a fixed number of bytes, storage space is allocated in integer multiples of block size, and logical blocks are associated one-to-one with physical blocks. In contrast, with key-value storage, data is stored as unstructured data, data is addressed by a variable-length key, storage space is allocated in increments of bytes, and the value is associated with the amount of physical storage used to store the data. In one embodiment, a key is variable length (e.g., 1-32 bytes) and is used across the data storage device 100. In this embodiment, the value is also variable length (e.g., one byte to several megabytes). Using a key-value allows the data storage device 100 to manipulate data based on content (e.g., search for a particular value and perform an encoding operation on a particular value). Further, a key-value system removes provisioning overhead.

Some example key-value operations are store, retrieve, delete, and list. With the store command, data is stored as a single value associated with a key. The data is not updatable or extendable in place, and the data is considered a complete value. Options available with the store command include compress/no compress, do not overwrite, and do not create. With the retrieve command, data is retrieved as a single value associated with the key. The data can be a portion of the value. Options available with the store command include decompress/provide raw data. The size of the value returned is the amount of the value that fits into a specified host buffer. In one example implementation, data starting at an index cannot be returned, and the host 300 provides a buffer large enough to retrieve the entire value. With the delete command, the key-value pair is deleted. With the exist command, a key is the input, and the command returns a status of 00h if the key-value pair exists; otherwise, a key-does-not-exist message is returned. With the list command, a list of all keys stored in the data storage device is provided. In one example implementation, the list starts with the key provided in the command, and the list is not sorted.

In one embodiment, the data storage device 100 implements a key-value system to store video frames. A key-value system is well suited to store video frames owing to the unequal and unaligned sizes of multiple frames that constitute a video stream. A value may comprise one or many video frames. The design of the data storage device 100 can determine whether it can store a single video frame or multiple video frames as a value. Storing a single video frame as a value can be done to associate a key with a specific image or video frame. The value in this case would be the raw data or a reference to the image or frame. Storing multiple video frames as a single value in a key-value data storage device is also feasible but can depend on the device's design and the size limitations of values. Some key-value stores are optimized for small values and may not handle large datasets efficiently. If the size of the video frames exceeds the data storage device's value size limitations, it may need to divide the frames into smaller chunks. Also, a key can be for multiple video frames associated with a group of pictures (GoP). In this case, the entire GoP can be stored and retrieved using a single key. In practice, the choice of whether to store single or multiple video frames in a key-value data storage device depends on specific application requirements, the data storage device's capabilities, and the intention to retrieve and process the data. Given that the video data is stored in key-value devices as a value and that there is enormous scope of processing video in a data storage device, the following embodiments can be used to provide a flow for such processing.

In general, in one embodiment, the controller 102 (sometimes referred to herein as the KV storage controller) of the data storage device 100 is configured to identify the number of video frames in a key-value, extract metadata of at least one video frame associated with the value, and subsequently perform a post-processing operation on the video frame(s) according to the extracted metadata. The extracted metadata can be the set of all objects that the KV controller 102 has processed and identified in the video frame through object analysis and associated such metadata to the key-value. In another dimension, the metadata that the controller 102 generates can be the property of the frame that the controller 102 has parsed from the value, such as compression type, resolution, interlaced/progressive frame, aspect ratio, and global position satellite (GPS) information. In some cases, the metadata is just a vendor-specific host hint regarding a key-value or a frame associated with the key-value.

In one embodiment, the KV storage controller 102 is further configured to group a set of key-values and the corresponding post-processed video frames according to the extracted metadata from one of its frames and further use the grouping information for data storage in the memory 104 (e.g., using a logical block address). For example, the controller 102 can route a set of all key-values whose video frames have a watermarking attached to one set of logical blocks and route the rest of the key-values without watermarking to another set of logical blocks. While doing so, the controller 102 can additionally tag the processed video data as device-specific data and store it in the logical blocks in the memory 104. In another example, the controller 102 can route the set of all key-values whose video frame(s) are associated with a predetermined object (such as a "red-car") as determined by its video processing engine. Likewise, the controller 102 can perform data management leveraging the KV group information from host-or device-determined group identification from metadata and/or based on processed data. The controller 102 can create a KV group by grouping metadata to the data and/or by grouping transformed data with the data.

Turning again to the drawings FIG. 4 is a diagram of an example controller 102 of an embodiment. As shown in FIG. 4, in this example, the controller 102 comprises a video metadata extraction module, a video processing engine, and a KV group and backend module. These modules/engines can be implemented by one or more processors of the controller 102, as noted above. In one example implementation, a full system would comprise all three module that execute in the order shown (i.e., 1, 2, and 3). However, the video processing engine and the metadata extraction module can work independently in some implementations. Also, the KV grouping can be done based on video metadata, the type of post-processing done, or based on an identified object in a video frame, for example.

More specifically, the video metadata extraction module is configured to extract a video frame from a value of a key, as well as extract metadata from a frame, data attribute, or frame attribute. The video metadata extraction module is also configured for storage management of metadata and key-mapping of generated metadata. So, in this module, the controller 102 extracts the metadata of the video frame associated with the value for the requested key. In one example implementation, the extracted metadata is the set of all objects that the KV controller 102 has processed and identified in the video frame and has associated such metadata with the key-value. In another example implementation, the metadata that the device provides is the property of the frame that the controller 102 has parsed from the value, such as compression type, resolution, interlaced/progressive frame, aspect ratio and global position satellite (GPS) information. Independently, the data storage device 100 can share the metadata either separately or alongside the value for a key retrieval request. The data storage device 100 may additionally opt to work in metadata-mode, wherein for a key retrieval request, the controller 102 sends the associated metadata for the key rather than the corresponding value when it determines that the mode of device operation is metadata-mode.

The video processing engine is configured to perform video frame extraction from a value of a key, as well as to process a frame according to the extracted metadata or independently from a host hint. The video processing engine is also configured to store transformed/post-processed data and perform key mapping of the transformed data. So, this module identifies the number of video frames in the key-value and processes at least one video frame associated with the value of a key according to the extracted metadata or simply a host hint. Optionally, the controller 102 can provide the processed data to the host 300 during a KV retrieval operation as an intermediate step apart from considering storage of transformed data in the memory 104. The processing can include, but is not limited to, filtering, sharpening, or post-processing at least one video/image frame among the identified number of frames in the corresponding key-value. The processing can be during KV retrieval or pre-processing during a KV store operation according to system design, and the controller 102 can store processed data separately in a device-specific non-volatile memory space and manage such pre-processed video data using a device-specific key-value mapping table.

The KV group and backend module is configured to group associated key-values based on extracted metadata or on performed post-processing and enable specific backend routing. The KV group and backend module is also configured to use different logical blocks for different KV groups to make KV group delete and KV list operations easier and to make storage more efficient. So, in a host-assisted approach, the KV host 300 tags certain key-values for specific predetermined data processing, and the controller 102 of the data storage device 100 is configured to perform the specific tagged task on the corresponding value during KV write operation, store the result in another NVM space, maintain a key-value mapping for such transformed data, and subsequently refer to the value result using another key according to a predetermined agreement. The controller 102 can optionally group a set of processed values under the KV group as allowed by the KV specification. The controller 102 can additionally opt to work in transform-mode, wherein for a key retrieval request, the controller 102 sends the transformed or processed data for the key rather than the corresponding value when it determines that the mode of device operation is transform-mode.

As discussed above, the post-processing can include the KV controller 102 performing filtering, sharpening, or any image processing on at least one video/image frame among the identified number of frames in the corresponding key-value, either based on the proposed extracted metadata or based on a host hint and additionally sharing the processed data to the host 300 as an intermediate step prior to data management of such transformed data. The controller 102 can perform all the mentioned actions during a KV store operation when a value for a key is to be stored in the memory 104. In some cases, the controller 102 can perform video processing and metadata extraction only during a KV retrieval operation, in which case the routing decisions during the KV store operation are according to legacy policies. Also, the controller 102 can use different logical blocks for different KV groups for easier KV group delete and KV list operations to provide efficient storage. It should be noted that while a KV group can be used to group similar or related data as performed by the host 300, in this embodiment, the grouping is done based on extracted video metadata, the type of post processing done, or based on the identified object in the video frame by the KV controller 102.

In addition to or instead of using the controller 102 for video processing, the controller 102 can be used for video frame searching using key-values. An efficient search capability is an important consideration for any storage system, especially in a system that stores video. A KV device can operate differently than a classic storage device in terms of commands, backend processing, and management, and the following embodiments provide a mechanism to handle video search capabilities in a KV device.

These embodiments can be used to enable a system that can optimally perform a frame or object search based on a key or its value, which is otherwise not possible in the current NVMe specification. The current NVMe specification allows KV store and KV retrieve operations as input-output (IO) commands. These embodiments can be used to integrate compute aspects in a KV device to enables faster search and retrieval of video frames. In general, the controller 102 is configured to identify the number of video frames in a value associated to a key, and generate text metadata from object analysis on the video frame and/or parse the inherent frame metadata and store it as text metadata in a device-specific location mapped to the corresponding key. The controller 102 is further configured to consolidate and store such text from a key-value as device-specific search-metadata and manage that using a key-to-metadata mapping data structure (e.g., table), wherein it manages all the metadata associated with a key-value against the key. The device may perform these steps during KV store (real time) or during idle time processing (non-real time) of each of the key-value frames to generate the database The controller 102 can use the metadata database to perform value-based searches, wherein it receives a data value, generates the metadata of the data value, and finally performs a quick text-based comparison of the generated metadata to the metadata database in the device-specific memory to either determine a match or a close match according to a system threshold of an inherent or analyzed parameter of a video frame. In this case, the one or more frames and the associated keys are retrieved based on a metadata search rather than the classic key-based value retrieval.

The key-metadata mapping is generated for those keys whose value is video-processed and hence eligible for a quick text-based search mechanism. The generated mapping of key-metadata is on par with key-value mapping and is device specific. The inherent frame metadata may include parameters such as aspect ratio, frame type, frame time-stamp, watermarking information, and subtitle information in a video frame parsed according to Motion Picture Experts Group (MPEG) transport specification.

Figure 5:
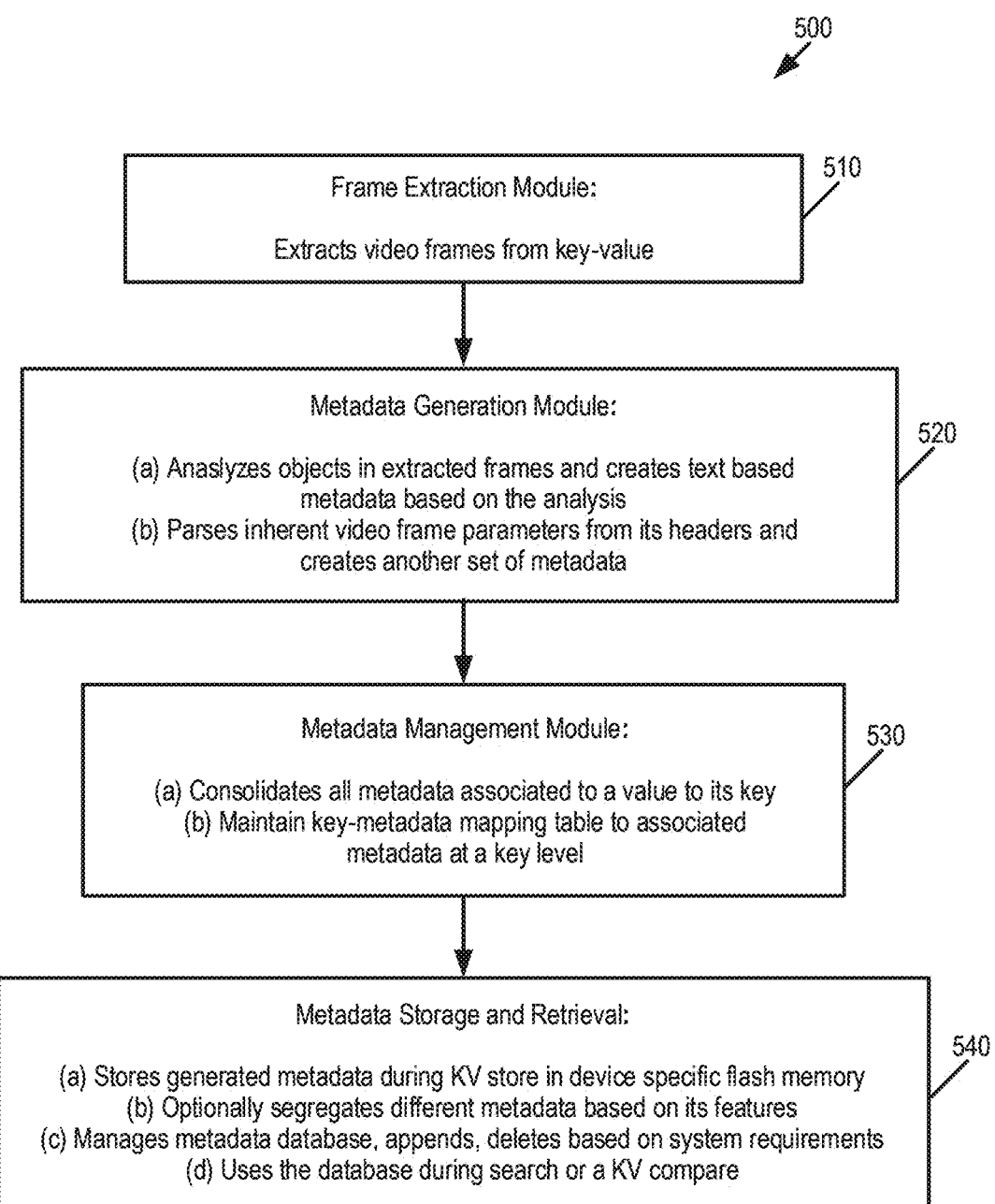
FIG. 5 is a flow chart of a method of an embodiment for performing a key- value store command.

FIG. 5 is a flow chart 500 of a method of an embodiment for performing a key-value store command. As shown in FIG. 5, the controller 102 extracts video frames from a key-value pair (510). Next, the controller 102 analyzes objects in the extracted frames and creates text-based metadata based on the analysis, after which the controller 102 parses inherent video frame parameters from its headers and creates another set of metadata (520). Then, the controller 102 consolidates all metadata associated with a value to its key and maintains a key-value-metadata mapping data structure (e.g., table at a key level (530). Finally, the controller 102 stores the generated metadata in device-specific memory 104 (optionally segregating different metadata), manages the metadata database, and used the database during a search or KV compare operation (540).

In a host-assisted approach, a search mechanism is enabled, wherein the metadata database is generated for those key-values according to the host hints. This segregates the set of all values that need to participate during value searches. It should be noted that although the flow and steps are provided specifically for video frames, these embodiments can be broadly applied to other data streams, such as, but not limited to, object audio and images used as values in a KV device.

Also, in one embodiment, a new "KV compare" operation is provided, where the host 300 would provide a data-value corresponding to a KV compare command, and a data storage device (compatible with this embodiment) is configured to process the value portion and check if there are any values in the memory 104 closely matching the provided value in terms of any of the metadata.

FIG. 6 is a flow chart 600 of a method of an embodiment for performing a key-value compare command. As shown in FIG. 6, the host 300 issues a KV command with a data value (610). The controller 102 then extracts the frame data (620) and generates metadata (630). Then, the controller 102 runs a compare operation in a loop, where, on each iteration, the controller 102 compares the generated metadata to multiple metadata database entries in the data storage device 100 (640). When there is a match, the controller 102 passes the corresponding key and value to the host 300 (650).

Since the metadata is accessed frequently for any KV compare, the controller 102 can store the device metadata in high-endurance and high-speed SLC blocks. Also, in some cases, instead of a value, the search may be performed based on the received key, wherein the controller 102 would fetch the key and retrieve the associated value of the key prior to performing the proposed operations. During the search (value or key based), the KV controller 102 can run the same process as that of a KV store, wherein it generates metadata for each of the frames of the value and runs a compare logic to search for this metadata in the metadata database that it manages.

The metadata generator module can create a lot of text metadata based on the features of the video frame such as frame dimensions, frame type, one or more objects in frame, frame date, and time metadata. Frame-to-text conversions can be used to generate better metadata. A table can be created for a key-value frame, wherein every frame in the value has a textual description.

In one example, if a key-value has three video frames associated to it:

Key 1—value 1's metadata:

Frame 1—metadata tagging of frame 1, frame type or objects or both-text on the video frame.

Frame 2—metadata tagging of frame 2, frame type or objects or both-text on the video frame.

Frame 3—metadata tagging of frame 3, frame type or objects or both-text on the video frame.

Key 2—value 2's metadata, analyzed or derived metadata for each frame. And so on for other key-values written during KV store.

The resulting metadata from every frame is stored in a device-specific memory mapped to the key itself. Since the metadata is accessed frequently for any KV compare, the controller 102 can store the device metadata in high endurance and high speed SLC blocks.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
one or more processors, individually or in combination, configured to:
receive a plurality of key-value (KV) store commands from a host, wherein each KV store command comprises a key-value in which at least one video frames is represented as a single value addressed by a key instead of by a logical block address;
extract metadata for each video frame in the plurality of key-values based on object analysis in each video frame and based on a parameter in a header in each video frame;
group the key-values into a plurality of sub-groups according to the extracted metadata;
store each sub-group of the key-values in a different set of logical storage blocks in the memory;

perform post-processing on at least one video frame according to the extracted metadata;

store a post-processed version of the at least one video frame in a data-storage-device-specific space in the memory;

store the extracted metadata in a mapping data structure;

receive, from a host, a search command comprising a data value;

generate metadata for the data value received from the host;

perform a compare operation between the generated metadata for the data value received from the host with the extracted metadata stored in the mapping data structure to identify one or more video frames stored in the memory that have matching metadata;

retrieve the post-processed version of the one or more video frames from the memory; and respond to the search command by sending, to the host, the post-processed version of the one or more video frames retrieved from the memory.

2. The data storage device of claim 1, wherein the one or more processors, individually or in combination, are further configured to:

store, in a location in the memory that is addressed by a logical block address, a result of an operation from at least one other key-value pair.

3. The data storage device of claim 1, wherein the one or more processors, individually or in combination, are further configured to:

perform data management leveraging key-value group information.

4. The data storage device of claim 1, wherein the parameter comprises compression type.

5. The data storage device of claim 1, wherein the memory comprises a three-dimensional memory.

6. The data storage device of claim 1, wherein the parameter comprises resolution.

7. The data storage device of claim 1, wherein the parameter comprises identification of an interlaced/progressive frame.

8. The data storage device of claim 1, wherein the parameter comprises aspect ratio.

9. The data storage device of claim 1, wherein the parameter comprises global position satellite (GPS) information.

10. The data storage device of claim 1, wherein the parameter comprises inherent frame metadata.

11. The data storage device of claim 1, wherein the extracted metadata is based on a host hint.

12. The data storage device of claim 1, wherein the memory comprises single-level cell blocks.

13. A method comprising:

performing in a data storage device comprising a memory:

receiving a plurality of key-value (KV) store commands from a host, wherein each KV store command comprises a key-value in which at least one video frame is represented as a single value addressed by a key instead of by a logical block address;

extracting metadata for each video frame in the plurality of key-values based on object analysis in each video frame and based on a parameter in a header in each video frame;

grouping the key-values into a plurality of sub-groups according to the extracted metadata;

storing each sub-group of the key-values in a different set of logical storage blocks in the memory;

performing post-processing on at least one video frame according to the extracted metadata;

storing a post-processed version of the at least one video frame in a data-storage- device-specific space in the memory;

storing the extracted metadata in a mapping data structure;

receiving, from a host, a search command comprising a data value;

generating metadata for the data value received from the host;

performing a compare operation between the generated metadata for the data value received from the host with the extracted metadata stored in the mapping data structure to identify one or more video frames stored in the memory that have matching metadata;

retrieving the post-processed version of the one or more video frames from the memory; and responding to the search command by sending, to the host, the post-processed version of the one or more video frames retrieved from the memory.

14. The method of claim 13, wherein the parameter comprises inherent frame metadata.

15. The method of claim 13, wherein the extracted metadata is based on a host hint.

16. The method of claim 13, wherein the metadata for each video frame is extracted during idle time.

17. The method of claim 13, wherein the memory comprises single-level cell blocks.

18. A data storage device comprising:

a memory;

means for receiving a plurality of key-value (KV) store commands from a host, wherein each KV store command comprises a key-value in which at least one video frames is represented as a single value addressed by a key instead of by a logical block address;

means for extracting metadata for each video frame in the plurality of key-values based on object analysis in each video frame and based on a parameter in a header in each video frame;

means for grouping the key-values into a plurality of sub-groups according to the extracted metadata;

means for storing each sub-group of the key-values in a different set of logical storage blocks in the memory;

means for performing post-processing on at least one video frame according to the extracted metadata;

means for storing a post-processed version of the at least one video frame in a data-storage-device-specific space in the memory;

means for storing the extracted metadata in a mapping data structure;

means for receiving, from a host, a search command comprising a data value;

means for generating metadata for the data value received from the host;

means for performing a compare operation between the generated metadata for the data value received from the host with the extracted metadata stored in the mapping data structure to identify one or more video frames stored in the memory that have matching metadata;

means for retrieving the post-processed version of the one or more video frames from the memory; and means for responding to the search command by sending, to the host, the post-processed version of the one or more video frames retrieved from the memory.

* * * * *